(12) United States Patent
Hamaguchi et al.

(10) Patent No.: US 8,467,462 B2
(45) Date of Patent: Jun. 18, 2013

(54) MULTICARRIER RECEIVING APPARATUS, MULTICARRIER COMMUNICATION SYSTEM AND DEMODULATION METHOD

(75) Inventors: Yasuhiro Hamaguchi, Ichihara (JP); Minoru Kubota, Chiba (JP); Shimpei To, Chiba (JP); Shoichi Shitara, Ichihara (JP); Kimihiko Imamura, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 724 days.

(21) Appl. No.: 12/092,509

(22) PCT Filed: Nov. 15, 2006

(86) PCT No.: PCT/JP2006/322724
§ 371 (c)(1),
(2), (4) Date: May 2, 2008

(87) PCT Pub. No.: WO2007/058193
PCT Pub. Date: May 24, 2007

(65) Prior Publication Data
US 2009/0046791 A1    Feb. 19, 2009

(30) Foreign Application Priority Data
Nov. 16, 2005   (JP) ................. 2005-331593

(51) Int. Cl.
*H04K 1/10* (2006.01)

(52) U.S. Cl.
USPC ........... 375/260; 375/267; 375/349; 375/347; 375/340; 375/324; 375/136; 375/142; 375/148; 375/150; 375/343; 375/E1.018; 375/E1.025; 375/E1.032; 375/143; 455/500; 455/501; 455/504; 455/506; 455/59; 455/226.3; 455/67.13; 455/132; 455/134; 455/135

(58) Field of Classification Search
USPC ......... 375/260, 267, 349, 346, 136, 142–145, 375/148–150, 343, E1.018, E1.025, E1.032, 375/347, 340, 324; 455/500, 501, 504, 506, 455/59, 63.1, 65, 67.13, 132, 134, 135, 226.3, 455/63
See application file for complete search history.

(56) References Cited

U.S. PATENT DOCUMENTS
6,944,142 B2 * 9/2005 Grieco ............................ 370/331
(Continued)

FOREIGN PATENT DOCUMENTS
JP    2003-87070 A    3/2003
(Continued)

OTHER PUBLICATIONS
3GPP TSG RAN WG1 Ad Hoc on LTE, "Pilot Channel and Scrambling Code in Evolved UTRA Downlink," 4.1, NTT DoCoMo, 2005, pp. 1-24.
(Continued)

*Primary Examiner* — Daniel Washburn
*Assistant Examiner* — Rahel Guarino
(74) *Attorney, Agent, or Firm* — Birch, Stewart, Kolasch & Birch, LLP

(57) ABSTRACT

To suppress effects produced on other terminals as much as possible, while obtaining the advantage of soft-combining. A multicarrier receiving apparatus that receives a packet comprised of at least a propagation path estimation symbol and a scrambled information symbol to demodulate, and has propagation path estimating sections 3-a and 3-b that respectively estimate propagation paths of radio signals transmitted from a plurality of transmission antennas, scramble multiplying sections 5-a and 5-b that respectively perform the same scrambling on propagation path estimation values output from the propagation path estimating sections 3-a and 3-b as scrambling provided in the information symbol on the transmission antennas sides, an adding section 3-c that adds scrambled propagation path estimation values, and a propagation path compensating section 7 that performs propagation path compensation of the information symbol included in the received packet using a signal output from the adding section 3-c.

4 Claims, 10 Drawing Sheets

U.S. PATENT DOCUMENTS

| | | | |
|---|---|---|---|
| 7,065,144 B2 * | 6/2006 | Walton et al. | 375/260 |
| 7,299,027 B2 * | 11/2007 | Sudo | 455/303 |
| 7,463,577 B2 * | 12/2008 | Sudo et al. | 370/208 |
| 2003/0123530 A1 * | 7/2003 | Maeda et al. | 375/148 |
| 2004/0116077 A1 | 6/2004 | Lee et al. | |
| 2004/0233838 A1 * | 11/2004 | Sudo et al. | 370/208 |
| 2006/0077944 A1 | 4/2006 | Ghosh et al. | |
| 2006/0250935 A1 * | 11/2006 | Hamamoto et al. | 370/203 |

FOREIGN PATENT DOCUMENTS

| | | |
|---|---|---|
| JP | 2004-88767 A | 3/2004 |
| JP | 2006-81131 A | 3/2006 |
| WO | WO-2004/054164 A1 | 6/2004 |

OTHER PUBLICATIONS

3GPP TSG RAN WG1 #42 on LTE, "Orthogonal Common Pilot Channel and Scrambling Code in Evolved UTRA Downlink," 10.4, NTT DoCoMo, NEC, SHARP, 2005, pp. 1-8.

3GPP TSG RAN WG1 Ad Hoc on LTE, "Investigations on Inter-Sector Diversity in Evolved UTRA Downlink," 4.3, NTT DoCoMo, 2005, pp. 1-7.

Tochihara et al., "A Transmission Diversity Scheme Employing Phase Hopping at Subcarriers for OFDM Transmission," The Institute of Electronics, Information and Communication Engineers (IEICE), Communications Society Conference. 2004, pp. 438.

* cited by examiner

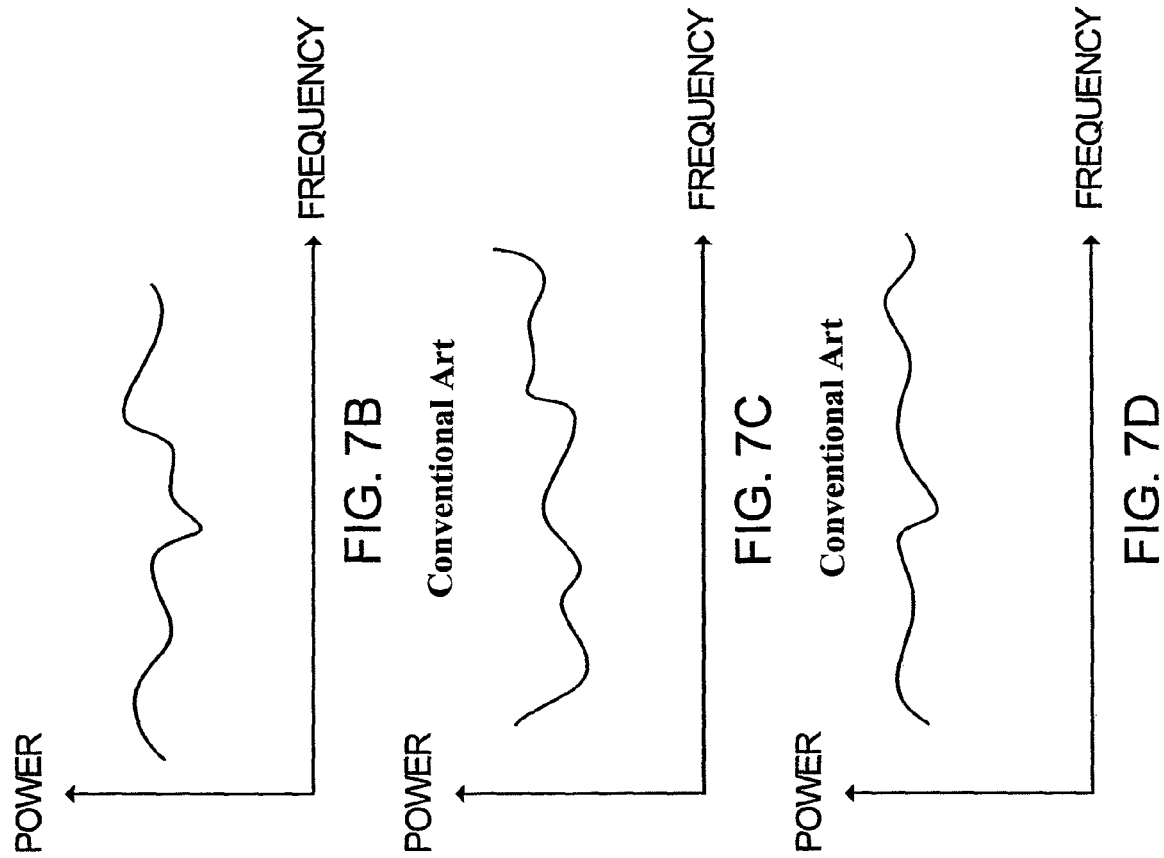
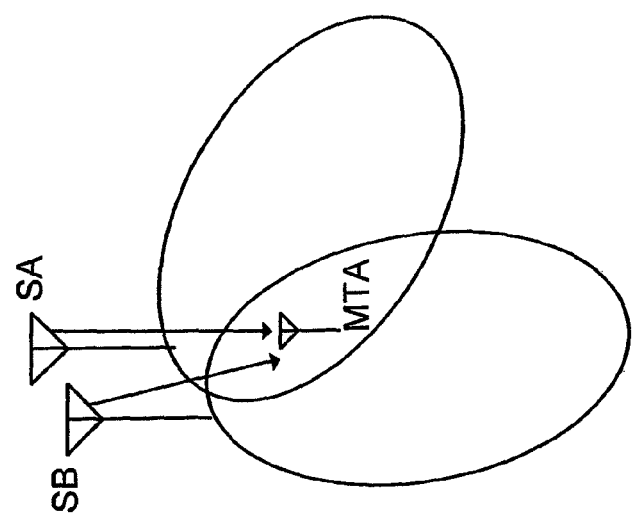

MULTICARRIER RECEIVING APPARATUS, MULTICARRIER COMMUNICATION SYSTEM AND DEMODULATION METHOD

TECHNICAL FIELD

The present invention relates to a multicarrier receiving apparatus, multicarrier communication system and demodulation method for combining and demodulating signals transmitted from some transmission antennas of a multicarrier transmitting apparatus provided with a plurality of transmission antennas or transmission antennas of a plurality of multicarrier transmitting apparatuses.

BACKGROUND ART

Radio communication techniques using OFDMA (Orthogonal Frequency Division Multiple Access) schemes have conventionally been known. This OFDMA scheme is an access technique using an OFDM signal form, where terminals perform communications using slots defined by the frequency and time.

In the following description, to simplify the explanation, it is assumed that the downlink channel is in a one-frequency reuse system i.e. a system where services are provided with the same frequencies in all the cells, and that a cell is comprised of three sectors.

Further, radio communication techniques using soft-combining have conventionally been known. This soft-combining is of technique for transmitting the same data from different antennas, and combining the data to demodulate on the receiving side, and used in locations such as cell edges and sector edges with poor radio signal conditions, cases of multicast, broadcast and the like where the same data is transmitted to a plurality of terminals from different transmission locations, and the like.

FIG. 7A is a diagram illustrating a state of propagation paths to a terminal in a sector edge. In the figure, SA and SB are transmission antennas respectively of a sector A and a sector B, and MTA is an antenna of a mobile station. FIG. 7B is a diagram illustrating the propagation path between the SA and MTA, and FIG. 7C is a diagram illustrating the propagation path between the SB and MTA. When the same data is transmitted from the SA and SB, the terminal is capable of receiving a signal of combined FIGS. 7B and 7C, and the characteristics are improved. FIG. 7D shows thus combined propagation path. In this way, although different data is originally transmitted, by transmitting the same data, the reception performance is improved.

To achieve soft-combining as described above, it is considered that the same signal is generated and transmitted for a propagation path estimation signal required for OFDM signal demodulation and the data. However, the propagation path estimation signal is used not only in propagation path estimation but also in identification of a transmission antenna, and there is a case that the same pattern cannot be used.

Therefore, a conceived scheme is to transmit a propagation path estimation symbol to be only distinguished in a receiver by any method. One of methods for assuming three sectors, concurrently transmitting propagation path estimation symbols, and dividing the symbols in a reception terminal, there is the method of transmitting signals every three subcarriers in each sector. Due to OFDM, the subcarriers are orthogonal to one another, and can be separated in the receiver with reliability. At this point, the propagation path information can be obtained only in one out of three subcarriers, but it is possible to estimate the propagation path information of the other subcarriers without problems by interpolating.

FIG. 8 is a block diagram illustrating a schematic configuration of an OFDM receiver capable of being used in the above-mentioned conventional system. In FIG. 8, an OFDM symbol synchronization section 100 acquires synchronization of a received symbol. An FFT (Fast Fourier Transform) section 101 performs fast Fourier transform and transforms the signal from the time domain to the frequency domain. A propagation path 1 estimating section 102-$a$ and propagation path 2 estimating section 102-$b$ respectively calculate propagation path estimation values of the propagation path 1 and propagation path 2 using propagation path estimation symbols. A propagation path combining estimating section 103 estimates a combined propagation path using the propagation path estimation values output from the propagation path 1 estimating section 102-$a$ and propagation path 2 estimating section 102-$b$. A propagation path compensating section 104 performs propagation path compensation using the combined propagation path estimation value output from the propagation path combining estimating section 103. A decoding section 105 decodes the data compensated for the propagation path.

Described next is the operation in performing soft-combining in OFDM reception configured as described above. The received data under goes symbol synchronization in the OFDM symbol synchronization section 100, and data corresponding to the number of points required for FFT is input to the FFT section 101. When a symbol for propagation path estimation is input to the FFT section 101, its output is input to both the propagation path 1 estimating section 102-$a$ and propagation path 2 estimating section 102-$b$. Each of the propagation path estimating sections estimates a propagation path for the respective antenna based on the orthogonality (by using different subcarriers in this conventional example) of the propagation path estimation symbol. In other words, the propagation path 1 estimating section 102-$a$ estimates propagation paths of all the subcarriers from a first transmitter that is a communicating party, and the propagation path 2 estimating section 102-$b$ estimates propagation paths of all the subcarriers from a second transmitter that is a communicating party.

Using these signals, the propagation path combining estimating section 103 estimates a combined propagation path of paths from the first transmitter and second transmitter. The combined propagation path is obtained by vector-addition of obtained frequency response for each subcarrier.

Upon receiving a subsequent data symbol, FFT is performed similarly, and the propagation path compensating section 104 compensates the data portion for the propagation path from the combined propagation path estimation value obtained previously. By this means, the propagation path is compensated in the data concurrently transmitted from the first transmitter and second transmitter. Next, the decoding section 105 performs decoding processing and the like in response to error correcting coding processed on the transmitting side, and the transmission data can be obtained.

Non-patent Document 1: 3GPP R1-0500615 "Investigations on Inter-Sector Diversity in Evolved UTRA Downlink" NTT DoCoMo

DISCLOSURE OF INVENTION

Problems to be Solved by the Invention

As described above, by transmitting the same data from different transmitters for soft-combining, SNR (Signal power to Noise power Ratio) and SINR (Signal power to Interference and Noise power Ratio) are improved in a terminal that receives the data, and the reception accuracy is enhanced.

However, in the case of considering the cellular system and the like, such transmission means that interfering power is increased in the other terminals, and reception characteristics deteriorate in the other terminals.

The present invention is carried out in view of such circumstances, and it is an object of the invention to provide a multicarrier receiving apparatus, multicarrier communication system and demodulation method capable of suppressing effects produced on other terminals as much as possible, while obtaining the advantage of soft-combining.

Means for Solving the Problem (1) To achieve the above-mentioned object, the present invention takes measures as described below. In other words, a multicarrier receiving apparatus according to the invention is a multicarrier receiving apparatus that receives a packet comprised of at least a propagation path estimation symbol and a scrambled information symbol to demodulate, and is characterized by having a propagation path estimating section that estimates a propagation path of a radio signal transmitted from each of a plurality of transmission antennas, a scramble multiplying section that performs the same scrambling on each propagation path estimation value output from the propagation path estimating section as scrambling provided in the information symbol on each of the transmission antennas side, an adding section that adds each scrambled propagation path estimation value, and a propagation path compensating section that performs propagation path compensation of the information symbol included in the received packet using a signal output from the adding section.

Thus, a propagation path of a radio signal transmitted from each of a plurality of transmission antennas is estimated, the propagation path estimation value is calculated by multiplying the scramble code provided in the information symbol for each antenna and combining to demodulate the data, and the frequency diversity effect can thereby be obtained. As a result, it is possible to improve the reception quality. Further, by providing different scramble codes for each transmission antenna, it is possible to suppress interference in the other terminals that have conventionally undergone interference from the signal subjected to soft-combining.

(2) Further, the multicarrier receiving apparatus according to the invention is characterized by further having a plurality of power judging sections which calculates reception power of radio signals transmitted from a plurality of transmission antennas and compares the reception power with a predetermined threshold, and a plurality of selecting sections which outputs zero to the scramble multiplying sections when a level of the calculated reception power is smaller than the threshold, while outputting a code determined for each of the transmission antennas or for each transmission apparatus to the scramble multiplying sections when a level of the calculated reception power is larger than the threshold, as a result of the comparison.

Thus, zero is output to the scramble multiplying sections when a level of the calculated reception power is smaller than the threshold, while a code determined for each of the transmission antennas or for each transmission apparatus is output to the scramble multiplying sections when a level of the calculated reception power is larger than the threshold, and it is thereby possible to determine whether or not to perform soft-combining corresponding to the level of the reception power.

(3) Further, a multicarrier receiving apparatus according to the invention is a multicarrier receiving apparatus that receives a packet comprised of at least a propagation path estimation symbol, a control symbol and a scrambled information symbol to demodulate, and is characterized by having a propagation path estimating section that estimates a propagation path of a radio signal transmitted from each of a plurality of transmission antennas, a plurality of buffer sections that stores respective propagation path estimation values, a plurality of selecting sections that outputs zero or the same code as a scramble code provided in the information symbol on each of the transmission antennas side based on a decoding result of the control symbol, a plurality of scramble multiplying sections that multiplies the propagation path estimation values stored in the buffer sections by signals output from the selecting sections respectively, an adding section that adds signals respectively output from the scramble multiplying sections, and a propagation path compensating section that performs propagation path compensation of the information symbol based on a signal output from the adding section.

Thus, a propagation path of a radio signal transmitted from each of a plurality of transmission antennas is estimated, and based on a decoding result of the control symbol, each propagation path estimation value is multiplied by zero or the same code as a scramble code provided in the information symbol on each of the transmission antennas side to be added. It is thereby possible to accurately know the timing of performing soft-combining, and to improve the reception quality. Further, since the data to undergo soft-combining is subjected to a different scramble code for each transmission antenna, it is possible to suppress interference in the other terminals that have conventionally undergone interference from the signal subjected to soft-combining.

(4) Further, a multicarrier communication system according to the invention is a multicarrier communication system in which radio communication is performed between a transmitting apparatus provided with a plurality of transmission antennas and the receiving apparatus as described in claim 1 or 2 by a multicarrier communication scheme, and is characterized in that the transmitting apparatus transmits a propagation path estimation symbol for identifying a propagation path and an information Symbol such that each subcarrier is multiplied by a scramble code for each of the transmission antennas from each of the transmission antennas at the same timing, and that the receiving apparatus receives the transmitted propagation path estimation symbol and the information symbol.

By this configuration, for each antenna, the propagation path estimation value is calculated by multiplying the scramble code provided in the information symbol and combining to demodulate the data, it is thereby possible to obtain the frequency diversity effect, and as a result, the reception quality can be improved. Further, by providing different scramble codes for each transmission antenna, it is possible to suppress interference in the other terminals that have conventionally undergone interference from the signal subjected to soft-combining.

(5) Further, a multicarrier communication system according to the invention is a multicarrier communication system in which radio communication is performed between a transmitting apparatus provided with a plurality of transmission antennas and the receiving apparatus as described in claim 3 by a multicarrier communication scheme, and is characterized in that the transmitting apparatus transmits a propagation path estimation symbol for identifying a propagation path, a control symbol including at least information indicating whether or not a packet to transmit uses the soft-combining method, and an information symbol such that each subcarrier is multiplied by a scramble code for each of the transmission antennas from each of the transmission antennas at the same timing, and that the receiving apparatus receives the transmitted propagation path estimation symbol, control symbol and information symbol.

According to this configuration, a propagation path of a radio signal transmitted from each of a plurality of transmission antennas is estimated, and based on a decoding result of the control symbol, each propagation path estimation value is multiplied by zero or the same code as a scramble code provided in the information symbol on each of the transmission antennas side to be added. It is thereby possible to accurately know the timing of performing soft-combining, and to improve the reception quality. Further, since the data to undergo soft-combining is subjected to a different scramble code for each transmission antenna, it is possible to suppress interference in the other terminals that have conventionally undergone interference from the signal subjected to soft-combining.

(6) Further, a demodulation method according to the invention is a demodulation method for receiving a packet comprised of at least a propagation path estimation symbol and a scrambled information symbol to demodulate, and is characterized by including at least the steps of estimating a propagation path of a radio signal transmitted from each of a plurality of transmission antennas and outputting a propagation path estimation value, performing the same scrambling on each propagation path estimation value as scrambling provided in the information symbol on each of the transmission antennas side, adding each scrambled propagation path estimation value, and performing propagation path compensation of the information symbol included in the received packet using the added signal.

Thus, for each antenna, the propagation path estimation value is calculated by multiplying the scramble code provided in the information symbol and combining to demodulate the data, it is thereby possible to obtain the frequency diversity effect, and as a result, the reception quality can be improved. Further, by providing different scramble codes for each transmission antenna, it is possible to suppress interference in the other terminals that have conventionally undergone interference from the signal subjected to soft-combining.

(7) Further, a demodulation method according to the invention is a demodulation method for receiving a packet comprised of at least a propagation path estimation symbol, a control symbol and a scrambled information symbol to demodulate, and is characterized by including at least the steps of estimating a propagation path of a radio signal transmitted from each of a plurality of transmission antennas and outputting a propagation path estimation value, storing the propagation path estimation value, outputting zero or the same code as a scramble code provided in the information symbol on each of the transmission antennas side based on a decoding result of the control symbol, multiplying each stored propagation path estimation value by output zero or code, adding each multiplied signal, and performing propagation path compensation of the information symbol based on the added signal.

Thus, a propagation path of a radio signal transmitted from each of a plurality of transmission antennas is estimated, and based on a decoding result of the control symbol, each propagation path estimation value is multiplied by zero or the same code as a scramble code provided in the information symbol on each of the transmission antennas side to be added. It is thereby possible to accurately know the timing of performing soft-combining, and to improve the reception quality. Further, since the data to undergo soft-combining is subjected to a different scramble code for each transmission antenna, it is possible to suppress interference in the other terminals that have conventionally undergone interference from the signal subjected to soft-combining.

Advantageous Effect of the Invention

According to the invention, a propagation path of a radio signal transmitted from each of a plurality of transmission antennas is estimated, the propagation path estimation value is calculated by multiplying the scramble code provided in the information symbol for each antenna and combining to demodulate the data, and the frequency diversity effect can thereby be obtained. As a result, it is possible to improve the reception quality. Further, by providing different scramble codes for each transmission antenna, it is possible to suppress interference in the other terminals that have conventionally undergone interference from the signal subjected to soft-combining.

BRIEF DESCRIPTION OF DRAWINGS

FIG. 7A is a diagram illustrating a state of propagation paths to a terminal in a sector edge; FIG. 7B is a diagram illustrating the propagation path between SA and MTA; FIG. 7C is a diagram illustrating the propagation path between SB and MTA; FIG. 7D is a diagram showing a combined propagation path;

DESCRIPTION OF SYMBOLS

Figure 1:
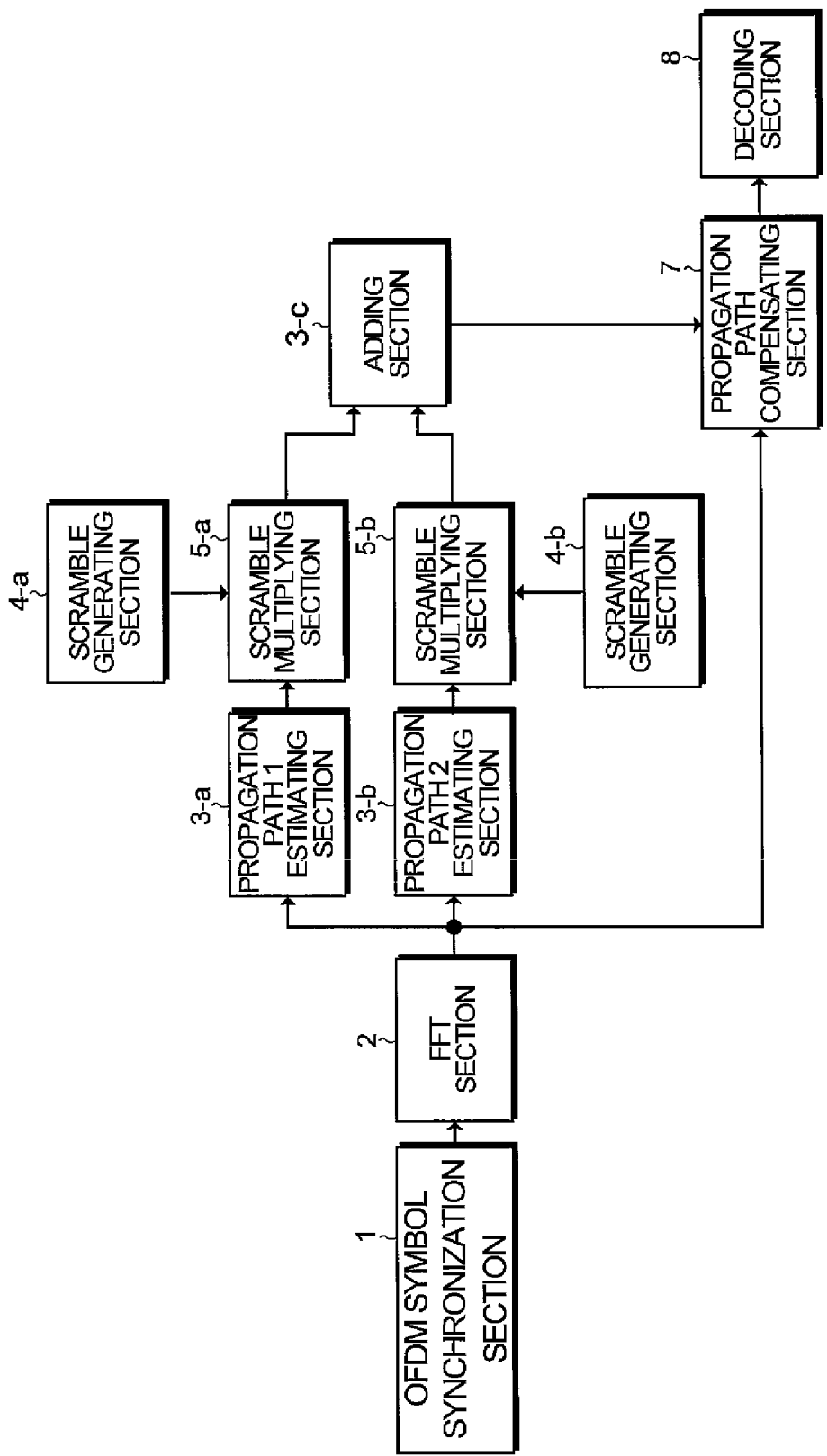
FIG. 1 is a block diagram illustrating a schematic configuration of a receiving apparatus according to the first embodiment.

1 OFDM symbol synchronization section
2 FFT section
3-*a* Propagation path 1 estimating section
3-*b* Propagation path 2 estimating section
3-*c* Adding section
4-*a* Scramble generating section
4-*b* Scramble generating section
5-*a* Scramble multiplying section
5-*b* Scramble multiplying section
6 Adding section
7 Propagation path compensating section
8 Decoding section
9-*a* Power judging section 9-b Power judging section
10-a Selecting section
10-b Selecting section
11-a Buffer section
11-b Buffer section
90 Transmitting section
91 Receiving section

BEST MODE FOR CARRYING OUT THE
INVENTION

Figure 10:
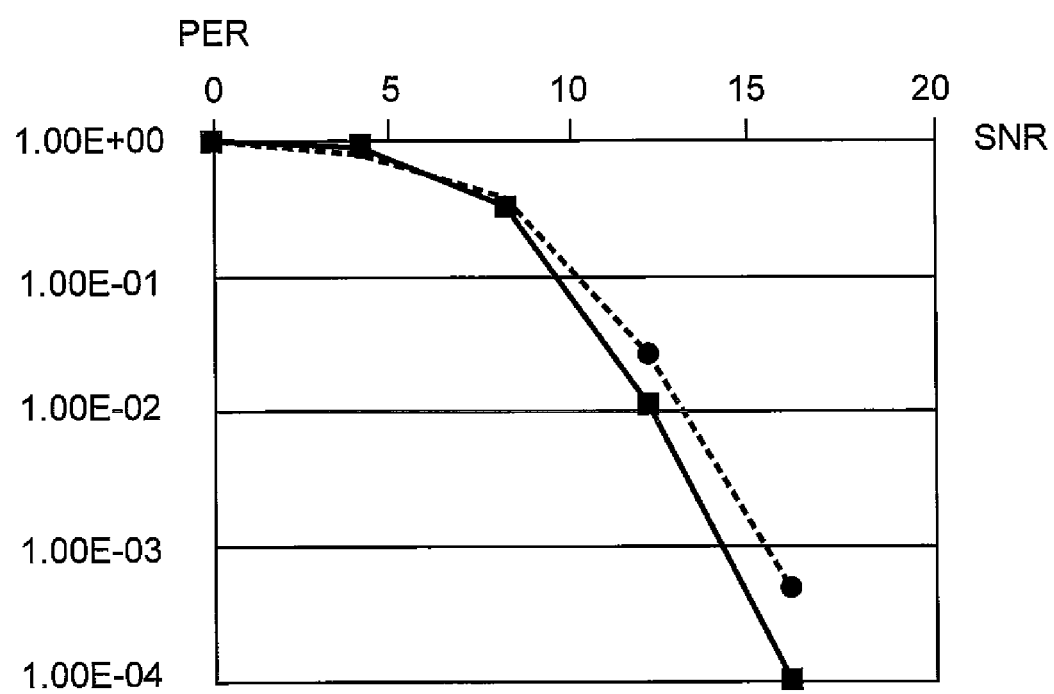
FIG. 10 is a diagram showing the state where the reception characteristics are improved by the frequency diversity effect.

Embodiments according to the invention are premised on the system described as the conventional technique, and intended to randomize data by scrambling the data using different codes for each transmitter (transmitting apparatus) also in transmitting the same data on the transmitting side when soft-combining is performed, so as to improve the reception performance by the frequency diversity effect, and reduce the effects on the other terminals. FIG. 10 is a diagram showing the state where the reception characteristics are improved by the frequency diversity effect. In FIG. 10, the horizontal axis represents SNR, the vertical axis represents PER (Packet Error Ratio), the dotted line shows reception characteristics in the case of not performing scrambling, and the solid line shows reception characteristics in the case of performing scrambling. As shown in FIG. 10, the reception characteristics are obviously improved. This is because of the frequency diversity effect caused by the phase varying randomly by scrambling.

In addition, the scrambling is realized by multiplying a subcarrier by a code for each OFDM symbol. In the case of N subcarriers, a code set C comprised of N codes is generated for each OFDM symbol, and multiplied by respective subcarriers. C varies among transmitters.

Herein, the code C to be used is not limited particularly, as long as C is a different pattern between transmitters, and the transmission and reception period is known. However, lower correlation between codes C enhances the frequency diversity effect, and has less effect on the terminal undergoing interference from the signal subjected to soft-combining.

Further, in the case of a cellular system and the like, the code C may be generated from a code specific to a base station for identifying the base station and a code for identifying a sector.

First Embodiment

FIG. 1 is a block diagram illustrating a schematic configuration of a receiving apparatus (receiver) according to the first embodiment. In FIG. 1, an OFDM symbol synchronization section 1 acquires synchronization of a received OFDM symbol. An section 2 performs fast Fourier transform on the received signal. A propagation path 1 estimating section 3-a and propagation path 2 estimating section 3-b respectively calculate propagation path estimation values of the propagation path 1 and propagation path 2. Scramble generating sections 4-a and 4-b respectively generate scramble patterns for the propagation path 1 and propagation path 2 to output.

Each of scramble multiplying sections 5-a and 5-b multiplies the propagation path estimation value by a scramble pattern. An adding section 3-c has the function of combining the propagation path to estimate. In other words, the section 3-c combines outputs of the scramble multiplying sections 5-a and 5-b, and calculates a combined propagation path estimation value. A propagation path compensating section 7 compensates the received signal for the propagation path based on the combined propagation path estimation value. A decoding section 8 demodulates the compensated received signal.

Described next is the operation of the receiving apparatus according to the first embodiment configured as described above. In addition, only the operation on soft-combining is described herein. An input OFDM signal is subjected to symbol synchronization in the OFDM symbol synchronization section 1, and data corresponding to the number of points required for FFT is input to the FFT section 2. When a symbol for propagation path estimation is input to the FFT section 2, its output is input to both the propagation path 1 estimating section 3-a and propagation path 2 estimating section 3-b. Each of the propagation path estimating sections estimates a propagation path for the respective antenna based on the orthogonality of the propagation path estimation symbol. In other words, the propagation path 1 estimating section 3-a estimates propagation paths of all the subcarriers from a first transmitter, and the propagation path 2 estimating section 3-b estimates propagation paths of all the subcarriers from a second transmitter.

When the data is input, the FFT section 2 transforms the signal from the time domain to the frequency domain by FFT processing, while the scramble generating sections 4-a and 4-b generate scramble patterns used in the transmission system, and the scramble multiplying sections 5-a and 5-b multiply the patterns by beforehand determined frequency responses, respectively.

Herein, for some subcarrier k, it is assumed that fk1 is the frequency response from the first transmitter estimated in the propagation path 1 estimating section 3-a, and that fk2 is the frequency response from the second transmitter estimated in the propagation path 2 estimating section 3-b. Further, in the subcarrier k used in demodulating the data, it is assumed that sk1 is a scramble code of the first transmitter, and that sk2 is a scramble code of the second transmitter. Two scramble multiplying sections respectively calculate fk1×sk1 and fk2× sk2 to input to the adding section 3-c.

The adding section 3-c calculates fk=fk1×sk1+fk2×sk2 to input to the propagation path compensating section 7 as propagation path compensation information. By complex-dividing the FFT-processed data by the propagation path compensation information fk, the propagation path and scramble code are canceled, and the signal is demodulated in the demodulation section. Herein, only the specific subcarrier k is described in detail, but all the subcarriers are subjected to the same processing in the OFDM signal.

Then, by updating the scramble code as in the transmitter whenever an OFDM data signal is input, it is possible to demodulate OFDM symbols successively.

According to the first embodiment, radio signals respectively from antennas are added without undergoing the effect from each other as an interfering component, and can be demodulated in the same performance as in transmitting the same data from both base stations as described in the conventional technique, and by eliminating the correlation between data from the transmitters by scrambling on the transmitting side, the reception quality is improved by the frequency diversity effect, while it is possible to suppress interference in terminals undergoing interference from the signal subjected to soft-combining.

In addition, the example of two transmission antennas is described herein, but it is possible to perform absolutely the same processing in the case of three or more antennas, and the accuracy is enhanced as the number of antennas increases.

Second Embodiment

The second embodiment describes a receiving apparatus further provided with On/Off function of soft-combining in the first embodiment. It is assumed herein that the receiving apparatus knows that signals for soft-combining are output in a reception packet or frame. Further, the second embodiment describes the case of using an orthogonal code in the OFDM symbol for propagation path estimation. Furthermore, the case is described herein that the receiving apparatus receives in soft-combining the data from two transmitters constituting sectors.

Figure 2:
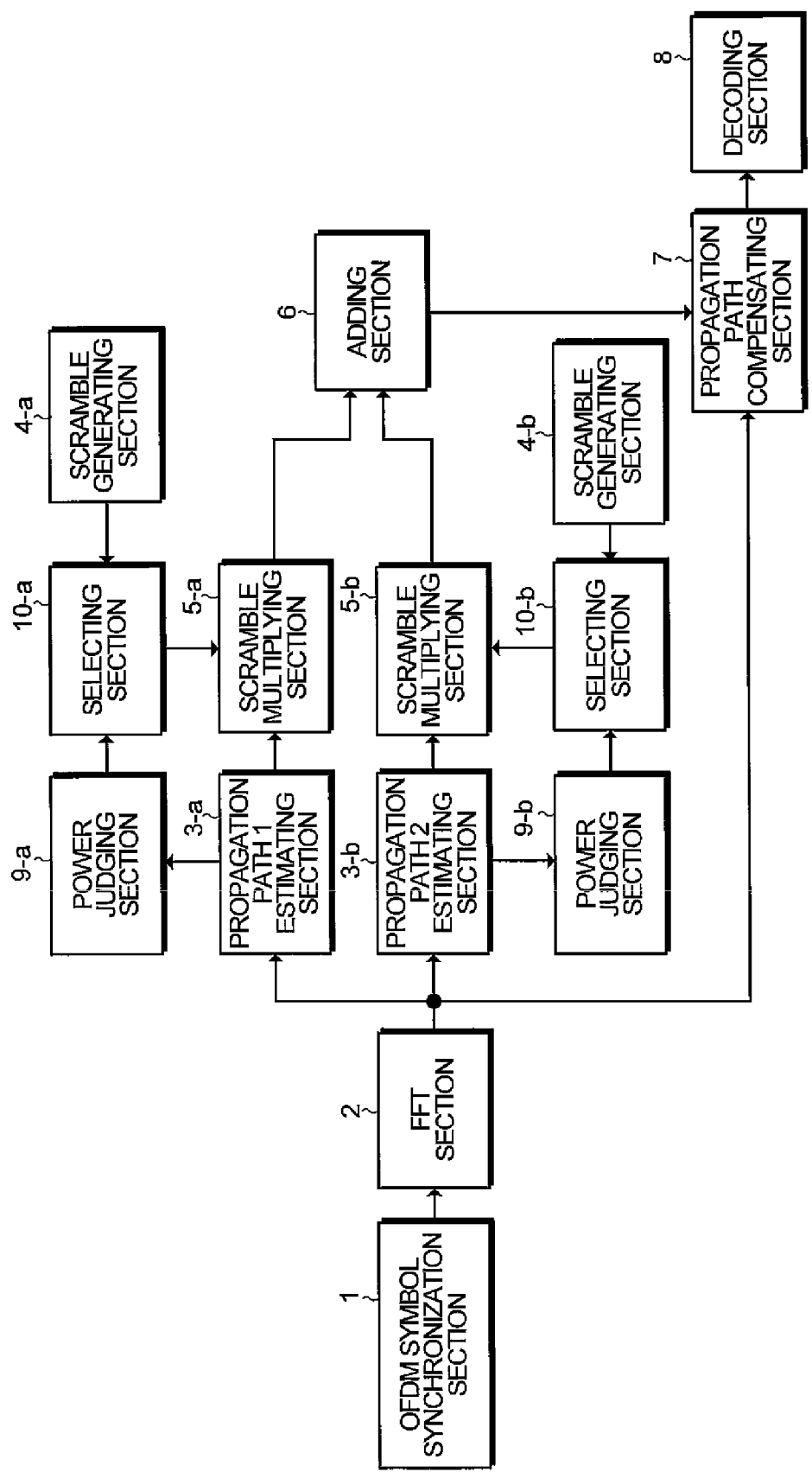
FIG. 2 is a block diagram illustrating a schematic configuration of a receiving apparatus according to the second embodiment.

FIG. 2 is a block diagram illustrating a schematic configuration of a receiving apparatus according to the second embodiment. In FIG. 2, blocks with the same functions as in the first embodiment are assigned the same reference numerals to omit descriptions thereof. Accordingly, in FIG. 2, power judging sections 9-a and 9-b and selecting sections 10-a and 10-b are added to the first embodiment.

The power judging sections 9-a and 9-b make judgments on whether radio signals are transmitted from sectors A and B from estimation results of the propagation path information as described above, respectively. When the signal is not transmitted, the output is only a noise component, and has an extremely low value. Accordingly, by setting a suitable criterion of judgment in the system, the receiving apparatus is capable of determining whether or not to perform soft-combining.

In judgments in the power judging sections 9-a and 9-b, when communications are performed using all the subcarriers of OFDM in the system, it is desired to average all the values. Further, when channels are formed as in OFDMA (Orthogonal Frequency Division Multiple Access) and communications are performed for each channel, it is desired to calculate an average for each channel.

The selecting sections 10-a and 1-b output "0" when judging that the signals are not transmitted from the sectors from results of the power judging sections 9-a and 9-b, while outputting results of the scramble generating sections when judging that the signals are transmitted from the sectors.

Figure 3:
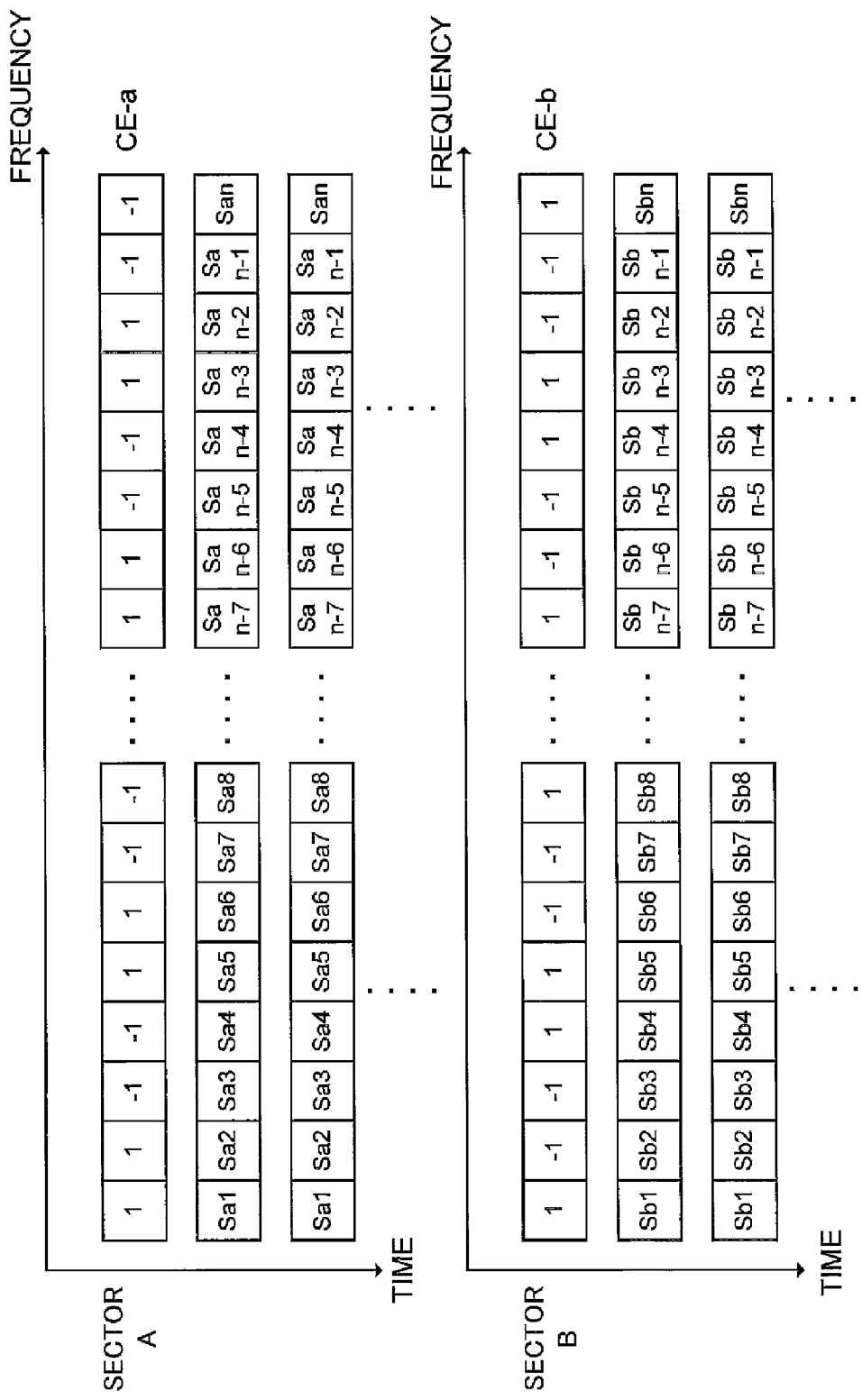
FIG. 3 is a diagram showing transmission patterns to achieve the second embodiment.

FIG. 3 is a diagram showing transmission patterns to achieve the second embodiment. In FIG. 3, Sa1 to San and Sb1 to Sbn are scramble codes (real numbers) known in a transmission/reception period, and are multiplied by the transmission data on the transmitter side. In other words, from the sector A, propagation path estimation symbol CE-a (CE: Channel Estimation) is transmitted prior to communication, the transmission data is then multiplied by scramble codes Sa1 to San, and the OFDM symbol is transmitted. The same manner is performed in the sector B. Herein, scramble codes are the same in all the OFDM symbols, but any problem does not arise when the scramble codes vary on a symbol basis while being known between the transmitting and receiving apparatuses.

Orthogonal codes are used in CE. The orthogonal codes are codes such that in codes A and B, A×B*("*" is a complex conjugate) of each element is calculated, and that zero is obtained by adding the results. The code of (1,1,−1,−1) is repeated for CE in the subcarrier (frequency) direction in the sector A, and (1,−1,−1,1) is used in the similar structure in the sector B. These are usable propagation path estimation symbols when the propagation path is considered certain in the order of four subcarriers. A method of estimating a propagation path in the receiving apparatus will be described below.

In some receiving apparatus, it is assumed that propagation paths of subcarriers k to k+3 from the sector A are uniformly fa−k, and that similarly, propagation paths from the sector B are uniformly fb−k. After receiving CE and synchronizing the symbol, outputs subjected to the FFT processing in the subcarriers k to k+3 are: fa−k×1+fb−k×1; fa−k×1+fb−k×(−1); fa−k×(−1)+fb−k×(−1); and fa−k×(−1)+fb−k×1.

In obtaining the propagation path from the sector A, multiplying the aforementioned values by (1,1,−1,−1) results in 4×fa−k, the resultant is finally divided by "4", and it is thereby possible to calculate the propagation path in k to K+3 from the sector A. Similarly, in obtaining the propagation path from the sector B, by multiplying by (1,−1,−1,1) and performing the same processing, it is possible to calculate fb−k.

Figure 4:
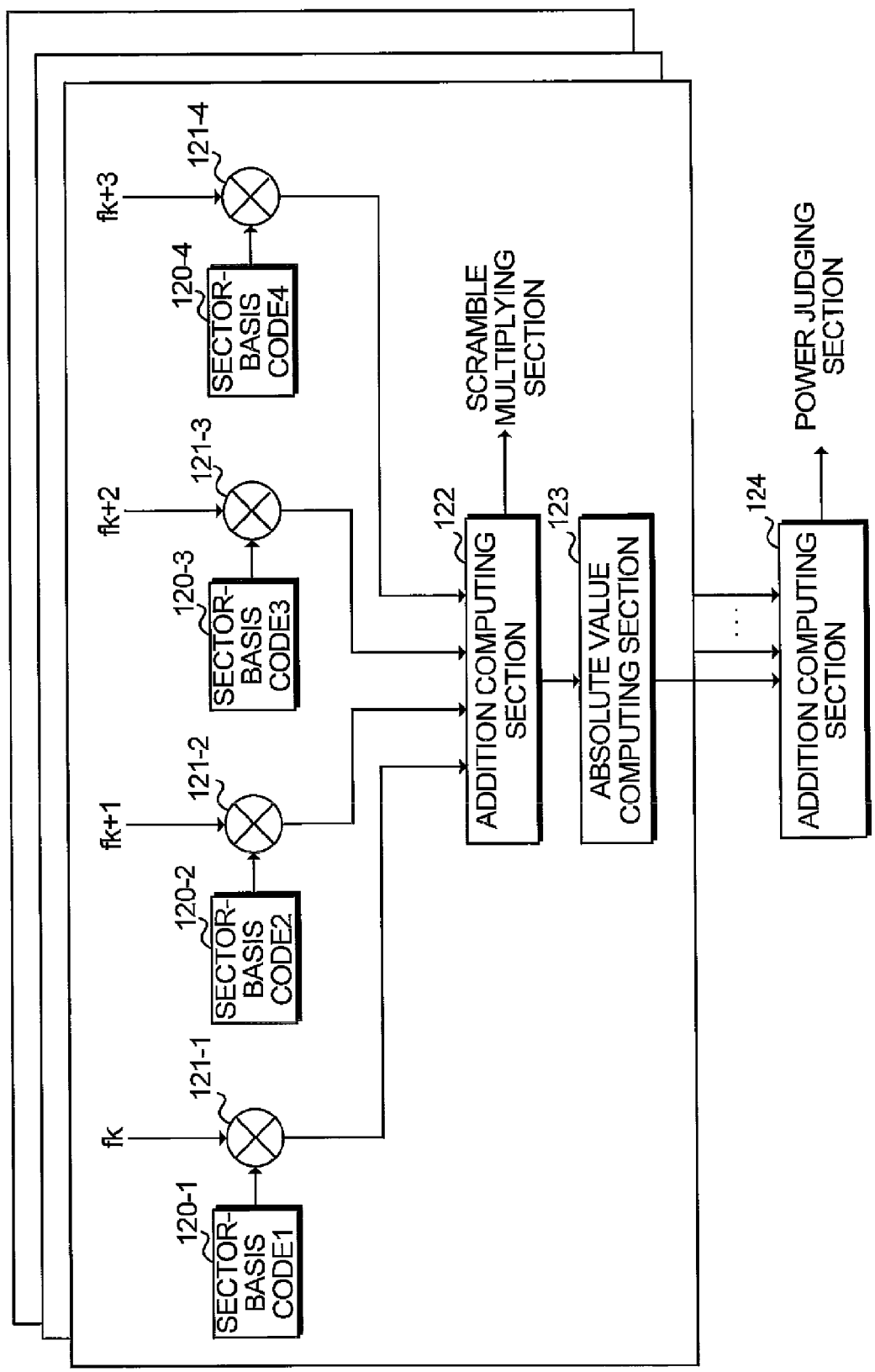
FIG. 4 is a block diagram illustrating a schematic configuration of a propagation path estimating section.

FIG. 4 is a block diagram illustrating a schematic configuration of a block (propagation path 1 estimating sections 3-a and 3-b) for calculating the correlation to estimate the propagation path. The propagation path estimation symbol is subjected to FFT, transformed into the data on the frequency axis, and multiplied by complex-conjugate signals (stored in Sector codes 1 (120-1) to 4(120-4)) of codes used in the transmission system in multiplying sections 121-1 to 121-4, respectively. For example, in detecting the correlation of the sector A, "1" is set on 120-1 and 120-2, and "−1" set on 120-3 and 120-4. In the case of the sector B, "1" is set on 120-1 and 120-4, and "−1" set on 120-2 and 120-3. Then, the resultants are added in an addition computing section 122. The signal is output to the scramble multiplying sections 5-a and 5-b, while an absolute value computing section 123 calculates an absolute value of the signal. Then, the value is added in the addition computing section 124 and output to the power judging sections 9-a and 9-b.

In the second embodiment, the OFDM symbol for propagation path estimation has a code structure only for identifying the sector. However, when a simple code as described above is used repeatedly, PAPR (Peak to Average Power Ratio) of the OFDM signal becomes high, resulting in a signal not suitable for communication. Therefore, it is considered further multiplying another scramble code. Any problem does not occur when the scramble code is the same as the scramble code used in a data portion or another scramble code. In this case, by further multiplying the block to set a code of the propagation path estimation block as described above by a scramble code for use in propagation path estimation used on the transmission side, the propagation path can be estimated in the same way.

As described above, according to the second embodiment, when the sectors A and B transmit data for soft-combining in the received signal, it is possible to determine whether performing soft-combining is better or not and receive the signal.

Third Embodiment

The above-mentioned second embodiment describes the case where it is beforehand known that the soft-combining information is transmitted, and the third embodiment describes the case of making a judgment on the soft-combining information or not to demodulate.

Figure 5:
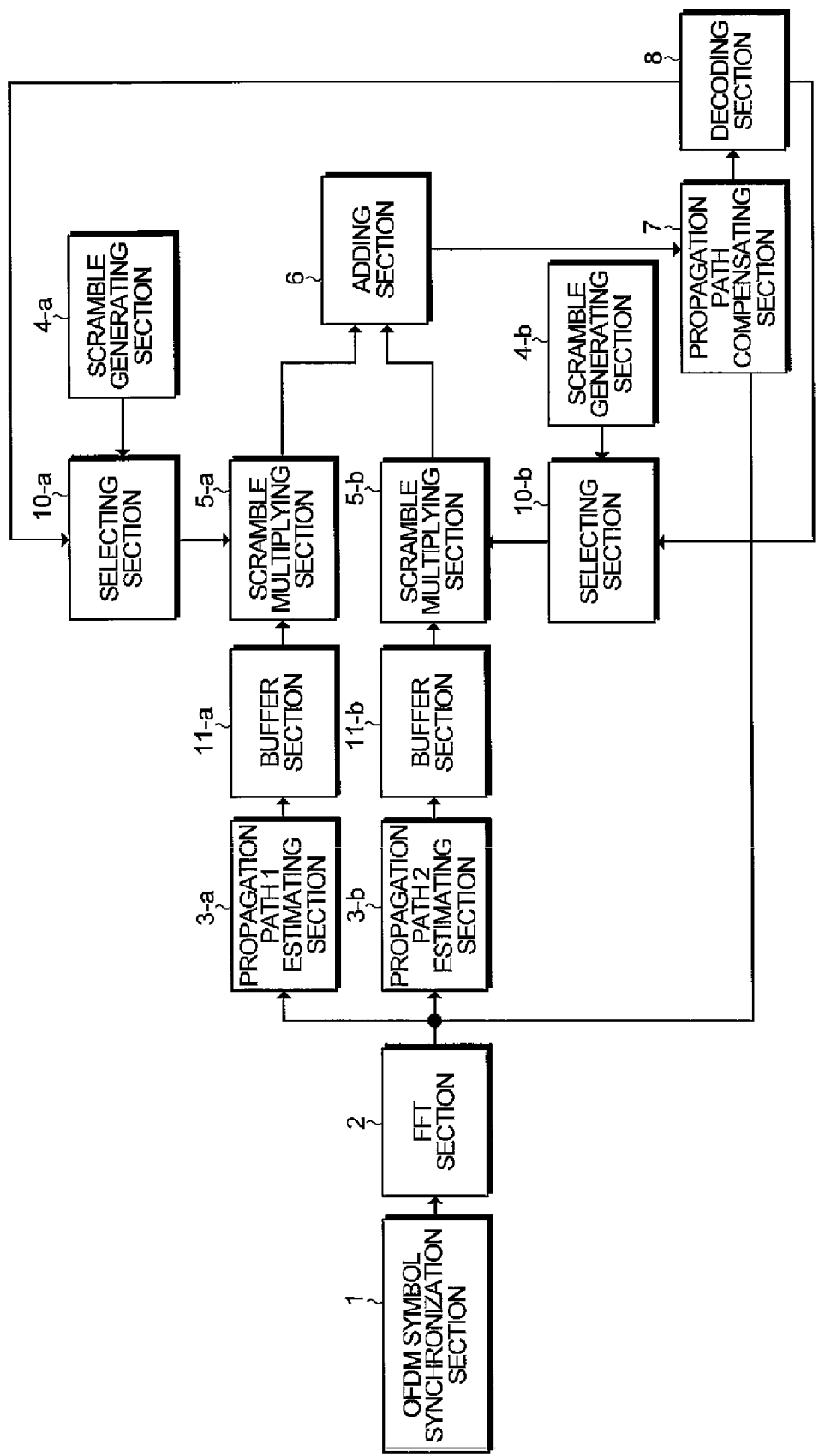
FIG. 5 is a block diagram illustrating a schematic configuration of a receiving apparatus according to the third embodiment.

FIG. 5 is a block diagram illustrating a schematic configuration of a receiving apparatus according to the third embodiment. In FIG. 5, blocks with the same functions as in the first embodiment and the second embodiment are assigned the same reference numerals to omit descriptions thereof. Accordingly, in the circuitry structure, the third embodiment differs from the first embodiment and second embodiment only in that buffer sections 11-a and 11-b are added.

Figure 6:
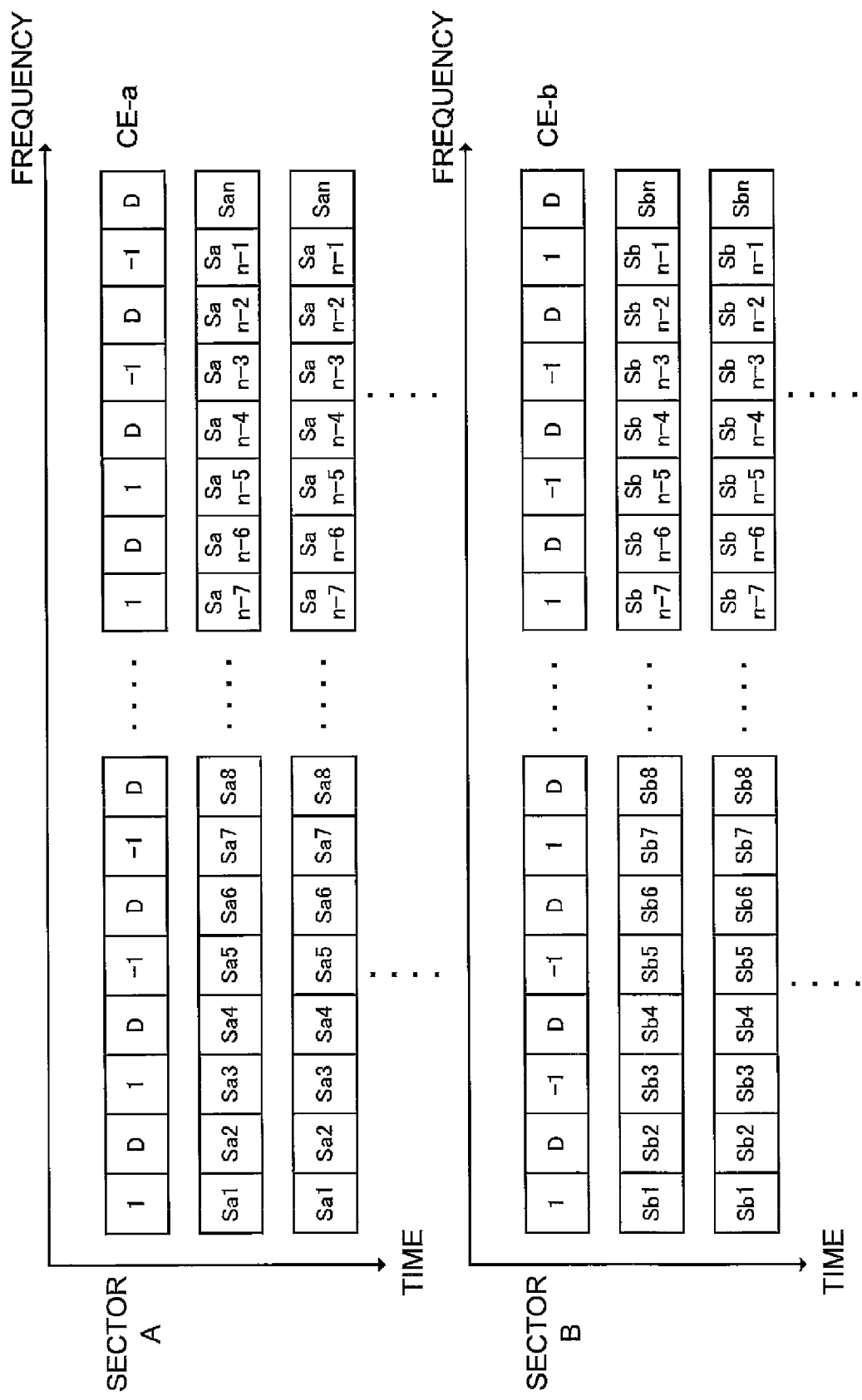
FIG. 6 is a diagram showing transmission patterns to achieve the third embodiment.
Figure 8:
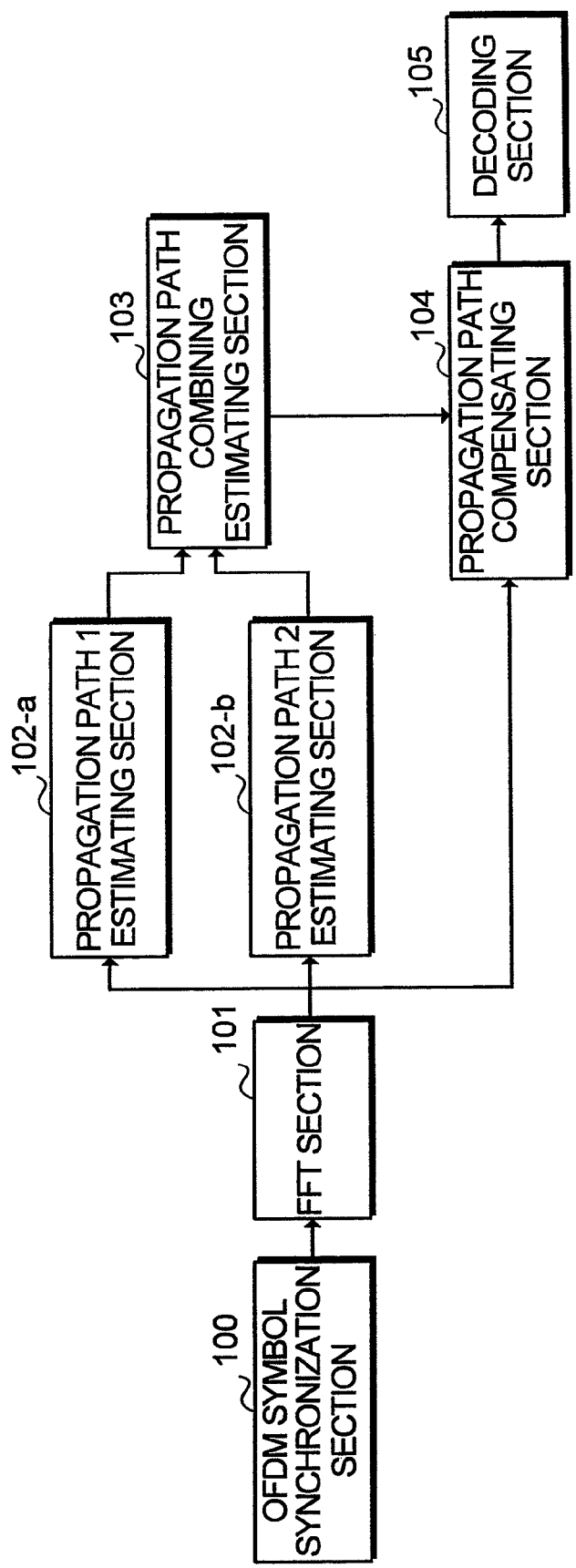
FIG. 8 is a block diagram illustrating a schematic configuration of a conventional OFDM receiver.

FIG. 6 is a diagram showing transmission patterns (2) to achieve the third embodiment. In FIG. 6, as in the second embodiment, the orthogonal code is used, and on the assumption that the propagation path hardly varies among eight subcarriers, the propagation path is estimated. Further, data is inserted in between subcarriers, and absolutely the same data is transmitted from the sector A and sector B. When the data is transmitted in such a configuration, while maintaining the randomness to some extent, it is possible to accurately demodulate the data portion inserted in CE both in a terminal that performs soft-combining and another terminal that receives the data only from one of the sectors. When the data portion indicates whether or not subsequent OFDM symbols are subjected to soft-combining, it is possible to perform soft-combining without using the propagation path estimation result. It is naturally possible to use a judgment from the propagation path estimation result together.

The propagation path 1 estimating sections 3-*a* and 3-*b* obtain eight propagation paths in the same method as in the second embodiment using every two carriers for propagation path estimation allocated according to the transmission pattern (2) among FFT-processed propagation path estimation symbols. After that, the data portion embedded in the propagation path estimation symbol is demodulated as in the second embodiment. When the data has the information notifying of soft-combining being operated, subsequent OFDM symbols are demodulated according to the soft-combining processing, while the ordinary reception processing is performed when the data does not notify of soft-combining being operated.

As described above, according to the third embodiment, since the data is demodulated after making a judgment on the soft-combining information or not, it is possible to enhance estimation accuracy of the propagation path, and to improve the reception quality.

In addition, as described above, the first to third embodiments describe only the configuration of the receiving apparatus for compensating for the propagation path. When the decoding section 8 uses error correction and the like based on the Viterbi algorithm, it is necessary to use a value in accordance with the reliability between subcarriers, and there is a case of requiring, as such a value, power information of the propagation path estimation result.

Figure 9:
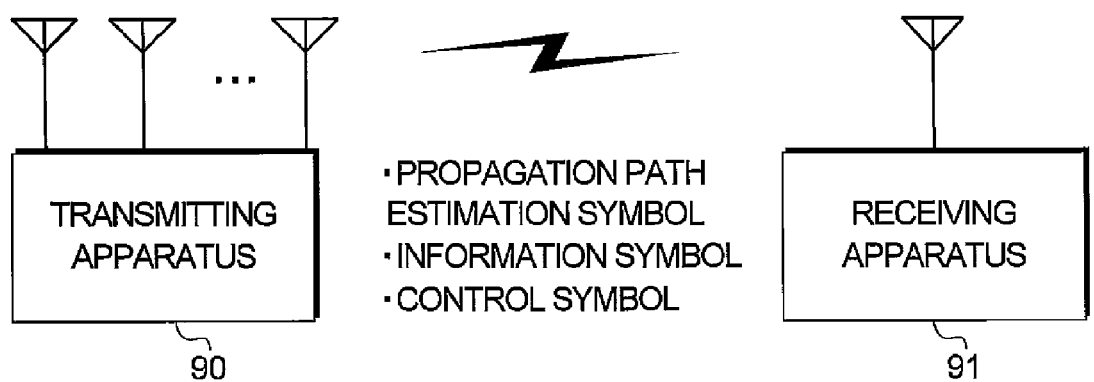
FIG. 9 is a diagram illustrating a multicarrier communication system according to the embodiments of the invention.

FIG. 9 is a diagram illustrating a radio communication system according to the embodiments of the invention. A transmitting apparatus 90 transmits a propagation path estimation symbol for identifying a propagation path and an information symbol such that each subcarrier is multiplied by a scramble code for each of the transmission antennas from each of the transmission antennas at the same timing. A receiving apparatus 91 receives the propagation path estimation symbol and the information symbol transmitted from the transmitting apparatus 90. By this means, a propagation path of a radio signal transmitted from each of a plurality of transmission antennas is estimated, the propagation path estimation value is calculated by multiplying the scramble code provided in the information symbol for each antenna and combining to demodulate the data, it is thereby possible to obtain the frequency diversity effect, and as a result, the reception quality can be improved. Further, by providing different scramble codes for each transmission antenna, it is possible to suppress interference in the other terminals that have conventionally undergone interference from the signal subjected to soft-combining.

Further, the transmitting apparatus 90 may transmit a propagation path estimation symbol for identifying a propagation path, a control symbol including at least information indicating whether or not a packet to transmit uses the soft-combining method, and an information symbol such that each subcarrier is multiplied by a scramble code for each of the transmission antennas from each of the transmission antennas at the same timing. The receiving apparatus 91 receives the propagation path estimation symbol, control symbol and information symbol transmitted from the transmitting apparatus 90. By this means, a propagation path of a radio signal transmitted from each of a plurality of transmission antennas is estimated, and based on a decoding result of the control symbol, each propagation path estimation value is multiplied by zero or the same code as a scramble code provided in the information symbol on each of the transmission antennas side to be added. It is thereby possible to accurately know the timing of performing soft-combining, and to improve the reception quality. Further, since the data to undergo soft-combining is subjected to a different scramble code for each transmission antenna, it is possible to suppress interference in the other terminals that have conventionally undergone interference from the signal subjected to soft-combining.

The invention claimed is:

1. A receiving apparatus receiving an OFDM signal, the receiving apparatus comprising:
   a Fourier transformation section configured to transform a channel estimation signal received by one reception antenna into a frequency domain;
   a channel estimating section configured to estimate a plurality of pieces of channel state information from the channel estimation signal transformed into a frequency domain by the Fourier transformation section and outputs the information;
   a multiplying section configured to multiply the plurality of pieces of channel state information by different codes;
   an adding section configured to add signals multiplied by the codes; and
   a demodulating section configured to demodulate the OFDM signal using a result of the addition, wherein:
   the plurality of pieces of channel state information is channel state information between a plurality of transmission antennas and the one reception antenna, and
   the different codes correspond to the plurality of transmission antennas respectively, and are multiplied respectively by the signals that are sent from the plurality of transmission antennas.

2. A wireless communication system comprising:
   a transmitting apparatus having a plurality of antennas; and
   a receiving apparatus, wherein:
   the transmitting apparatus is configured to transmit, to the receiving apparatus, an OFDM signal that is in an orthogonal relation to a signal for channel estimation, and
   the receiving apparatus includes:
   a Fourier transformation section configured to transform a channel estimation signal received by one reception antenna into a frequency domain;
   a channel estimating section configured to estimate a plurality of pieces of channel state information from the channel estimation signal transformed into a frequency domain by the Fourier transformation section and outputs the information;
   a multiplying section configured to multiply the plurality of pieces of channel state information by different codes;
   an adding section configured to add signals multiplied by the codes; and
   a demodulating section configured to demodulate the OFDM signal using a result of the addition, and wherein:
   the plurality of pieces of channel state information is channel state information between a plurality of transmission antennas and the one reception antenna, and
   the different codes correspond to the plurality of transmission antennas respectively, and are multiplied respectively by the signals that are sent from the plurality of transmission antennas.

3. A receiving method of a receiving apparatus receiving an OFDM signal, the receiving method comprising:
   transforming a channel estimation signal received by one reception antenna into a frequency domain;
   estimating a plurality of pieces of channel state information from the channel estimation signal transformed into a frequency domain and outputting the information;
   multiplying the plurality of pieces of channel state information by different codes;
   adding a signal multiplied by the codes; and
   demodulating the OFDM signal using a result of the addition; wherein:
   the plurality of pieces of channel state information is channel state information between a plurality of transmission antennas and the one reception antenna, and
   the different codes correspond to the plurality of transmission antennas respectively, and are multiplied respectively by the signals that are sent from the plurality of transmission antennas.

4. The wireless communication system according to claim 3, wherein the orthogonal relation of the signal for channel estimation is formed by a code division multiplex.

* * * * *